(12) United States Patent
Sohail et al.

(10) Patent No.: US 12,487,971 B2
(45) Date of Patent: Dec. 2, 2025

(54) DATA DEDUPLICATION TECHNIQUES FOR DISTRIBUTED COMPUTING ENVIRONMENTS

(71) Applicant: Dell Products L.P., Round Rock, TX (US)

(72) Inventors: Mohamed Sohail, Sheikh Zayed (EG); Said Tabet, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/417,791

(22) Filed: Jan. 19, 2024

(65) Prior Publication Data

US 2025/0238400 A1 Jul. 24, 2025

(51) Int. Cl.
*G06F 16/00* (2019.01)
*G06F 16/14* (2019.01)
*G06F 16/174* (2019.01)
*G06F 16/182* (2019.01)

(52) U.S. Cl.
CPC ........ *G06F 16/1752* (2019.01); *G06F 16/152* (2019.01); *G06F 16/182* (2019.01)

(58) Field of Classification Search
CPC ... G06F 16/1752; G06F 16/152; G06F 16/182
See application file for complete search history.

(56) References Cited

U.S. PATENT DOCUMENTS

| 9,298,723 B1 * | 3/2016 | Vincent | G06F 16/183 |
| 10,977,218 B1 * | 4/2021 | Umstot | G06F 16/1873 |
| 2002/0078174 A1 * | 6/2002 | Sim | H04L 67/1095 |
| | | | 709/252 |
| 2012/0173558 A1 * | 7/2012 | Sorenson, III | G06F 16/215 |
| | | | 707/E17.014 |
| 2015/0058301 A1 * | 2/2015 | Kolodner | G06F 16/1748 |
| | | | 707/692 |
| 2017/0371904 A1 * | 12/2017 | Barajas Gonzalez | |
| | | | G06F 16/215 |

(Continued)

OTHER PUBLICATIONS

Li, Yongbo, "MobiQoR: Pushing the Envelope of Mobile Edge Computing via Quality-of-Result Optimization", Jun. 2017.

(Continued)

*Primary Examiner* — Noosha Arjomandi
(74) *Attorney, Agent, or Firm* — Ryan, Mason & Lewis, LLP (57) ABSTRACT

Methods, apparatus, and processor-readable storage media for deduplicating data in distributed computing environments are provided herein. An example computer-implemented method includes obtaining, by a node of a distributed computing system, a set of data from an edge device, and identifying a data type corresponding to the set of data from among a plurality of data types. The method includes using information corresponding to the identified data type to determine whether one or more portions of data in the set of data were previously uploaded to at least one server of the distributed computing system. The method also includes, in response to determining that the one or more portions of the data were previously uploaded, updating the set of data by removing the one or more portions of the data from the set of data, and uploading the updated set of data to the at least one server.

20 Claims, 8 Drawing Sheets

(56) References Cited

U.S. PATENT DOCUMENTS

2019/0205413 A1\* 7/2019 Chung .................. G06F 16/152
2022/0129426 A1   4/2022 Sohail et al.
2024/0256568 A1\* 8/2024 Schmoll .............. G06F 11/1458

OTHER PUBLICATIONS

Pg, Shynu, et al. "A Secure Data Deduplication System for Integrated Cloud-Edge Networks." Journal of Cloud Computing 9, Dec. 2020.

\* cited by examiner

DATA DEDUPLICATION TECHNIQUES FOR DISTRIBUTED COMPUTING ENVIRONMENTS

BACKGROUND

Edge computing generally refers to a distributed computing paradigm that positions data computation and/or data storage closer to the sources of data. Edge computing environments are highly distributed and decentralized, and therefore present many challenges for information technology (IT) operations.

SUMMARY

Illustrative embodiments of the disclosure provide data deduplication techniques for distributed computing environments. An exemplary computer-implemented method includes obtaining, by a node of a distributed computing system, a set of data from at least one processing device, and identifying a data type corresponding to the set of data from among a plurality of data types. The method includes using a first set of information corresponding to the identified data type to determine whether one or more portions of data in the set of data were previously uploaded to at least one cloud server of the distributed computing system. The method also includes, in response to determining that the one or more portions of the data were previously uploaded, updating the set of data by removing the one or more portions of the data from the set of data, and uploading the updated set of data to the at least one server.

Illustrative embodiments can provide significant advantages relative to conventional data deduplication techniques. For example, technical problems associated with deduplicating data are mitigated in one or more embodiments using a deduplication process that classifies data based on previously uploaded data.

These and other illustrative embodiments described herein include, without limitation, methods, apparatus, systems, and computer program products comprising processor-readable storage media.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

The Internet of Things (IoT) broadly refers to a network of physical objects or devices that are capable of communicating data over the Internet. As a non-limiting example, an IoT device can include one or more sensors, one or more actuators, and/or one or more communication modules.

Distributed computing environments, such as edge computing environments, are increasingly being utilized to support a variety of IoT applications and services. For example, data ingested from IoT devices can be accessed by various users, and at various locations. Video data, for example, can be used for marketing, augmented reality, surveillance, entertainment, data mining, machine learning, and other purposes. IoT data can, once stored and shared, be easily accessed, and used or analyzed by different organizations and/or entities and for a wide variety of purposes, such as for self-driving vehicles, industrial automation, and machine-to-machine communications.

For example, data generated by IoT devices (also referred to as edge devices or applications), once ingested to the cloud, can be distributed or replicated to various datacenters or sites, thereby enabling users and/or applications to access and/or use the data. In addition to ingesting and storing data, use of the data in the cloud may also generate additional data.

Although some embodiments are described herein with reference to edge computing environments, it is to be appreciated that these and other embodiments are also applicable to other types of distributed computing environments.

In some edge computing environments, edge nodes can collect data for different applications and/or services running on the same edge nodes, possibly having different QoS (Quality of Service) requirements. In such situations, the collected data can include different data types and different storage requirements. Existing deduplication techniques for intra-node deduplication and clustered deduplication are often not suitable for these situations because the data spans different types of applications and/or different data types.

In light of the massive amounts of data that may be generated (both at the edge and in the cloud) and shared, at least some embodiments described herein relate to managing such data, for example, by performing collaborative data reduction and/or collaborative data deduplication operations. Some embodiments described herein may provide deduplication techniques that can achieve higher deduplication rates and/or improve bandwidth utilization (e.g., due to data reduction) in edge computing environments.

Figure 1:
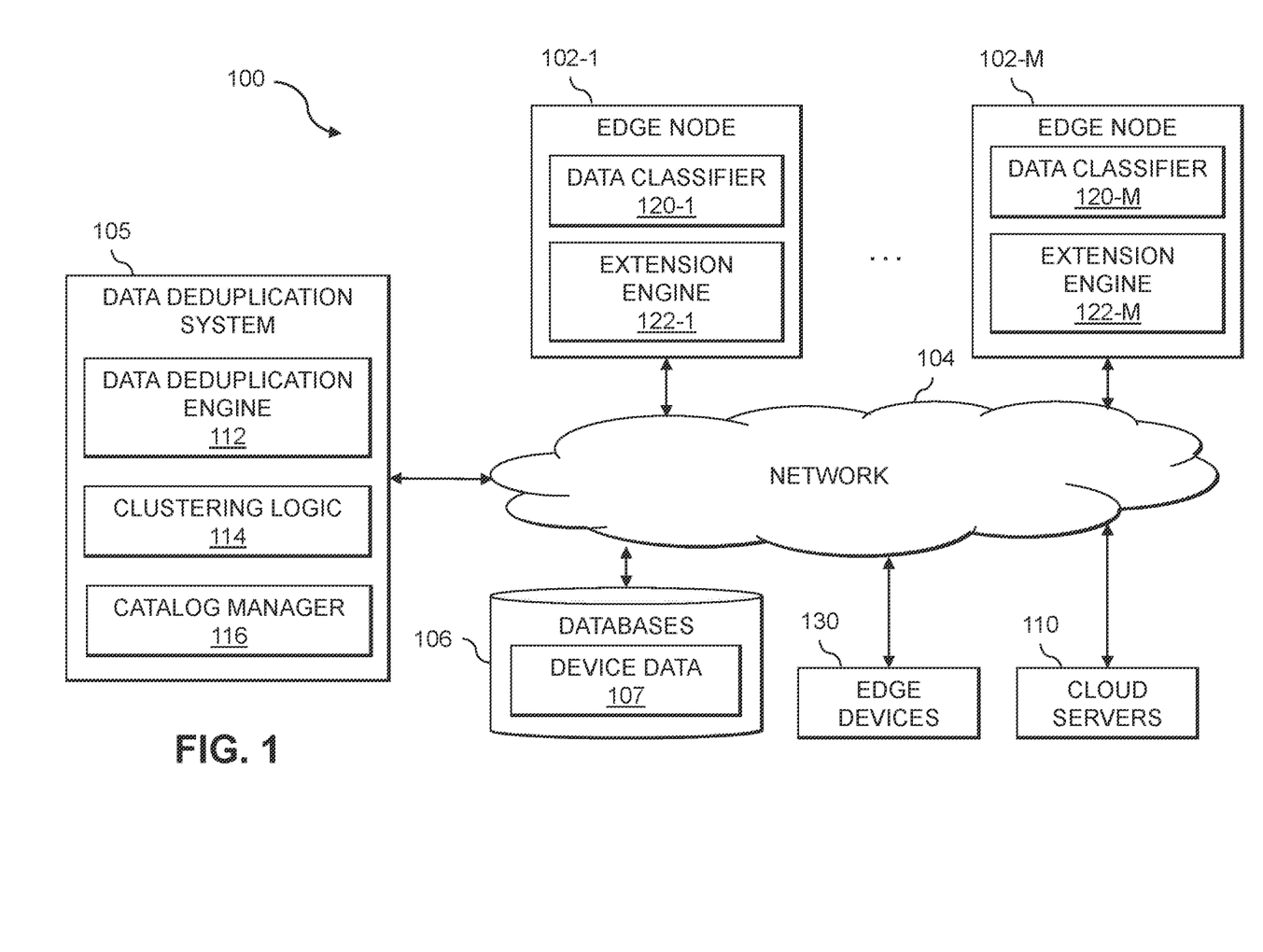
FIG. 1 shows a distributed computing system configured for data deduplication techniques in an illustrative embodiment.

FIG. 1 shows a computer network (also referred to herein as a distributed computing system or an information processing system) 100 configured in accordance with an illustrative embodiment. The computer network 100 comprises a plurality of nodes, such as edge nodes 102-1, ... 102-M, collectively referred to herein as edge nodes 102. The edge nodes 102 are coupled to a network 104, where the network 104 in this embodiment is assumed to represent a sub-network or other related portion of the larger computer network 100. Accordingly, elements 100 and 104 are both referred to herein as examples of "networks," but the latter is assumed to be a component of the former in the context of the FIG. 1 embodiment. Also coupled to network 104 is a data deduplication system 105, one or more servers (e.g., one or more cloud servers 110), and one or more edge devices 130. In some embodiments, the data deduplication system 105 can correspond to, or can be implemented on, a cloud server of an edge computing environment, as explained in more detail elsewhere herein. The cloud servers 110 and the edge devices 130 (also referred to herein as processing devices) are discussed further below in conjunction with FIGS. 2A and 2B, for example.

The edge nodes 102 may comprise, for example, servers and/or portions of one or more server systems or other devices. The edge devices 130 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The edge nodes 102 in some embodiments comprise respective computers associated with one or more users and/or a particular company, organization, or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

In the FIG. 1 embodiment, it is assumed that each of the edge nodes 102 includes respective data classifiers 120-1, . . . 120-M (collectively data classifiers 120) and respective extension engines 122-1, . . . 122-M (collectively extension engines 122). In the FIG. 1 embodiment, each edge node 102 includes a single data classifier 120, however, it is to be appreciated that in other embodiments at least one of the edge nodes 102 may include multiple data classifiers (e.g., edge node 102-1 may include a data classifier for each of a plurality of types of data).

The data classifier 120-1, for example, in some embodiments, can include functionality for identifying and classifying portions of the data corresponding to the edge devices 130. For example, the data classifier 120-1 can classify data based on a set of categories. As non-limiting examples, the set of categories may be based on one or more types of applications that use the data, types of data (e.g., image data, video data, streamed data), file extensions associated with such data, and/or QoS levels related to such data.

The extension engine 122-1 generally includes functionality to be implemented or installed on the edge node 102-1. In some embodiments, the extension engine 122-1 can coordinate with the data deduplication system 105 to identify and remove duplicative data. As a non-limiting example, the extension engine 122-1 can maintain and update one or more catalogs (or sets of information) indicating whether the edge node 102-1 has previously sent a particular portion of data to a cloud server (e.g., associated with the data deduplication system 105) in order to deduplicate data and/or files associated with the edge devices 130, as explained in more detail elsewhere herein.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (TP) or other related communication protocols.

Additionally, the edge nodes 102 and/or the data deduplication system 105 can have one or more associated databases 106 configured to store device data 107 pertaining to, for example, one or more of the edge devices 130. In some embodiments, the device data 107 may also include metadata associated with such data (e.g., categories of the data, one or more data sources, one or more data paths, storage locations, and/or storage types).

An example database 106, such as depicted in the present embodiment, can be implemented using one or more storage systems associated with the data deduplication system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the data deduplication system 105 are one or more input-output devices, which illustratively comprise keyboards, displays or other types of input-output devices in any combination. Such input-output devices can be used, for example, to support one or more user interfaces to the data deduplication system 105, as well as to support communication between data deduplication system 105 and other related systems and devices not explicitly shown.

Additionally, the data deduplication system 105 in the FIG. 1 embodiment is assumed to be implemented using at least one processing device. Each such processing device generally comprises at least one processor and an associated memory and implements one or more functional modules for controlling certain features of the data deduplication system 105.

More particularly, the data deduplication system 105 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

A network interface may allow the data deduplication system 105 to communicate over the network 104 with the edge nodes 102, and illustratively comprises one or more conventional transceivers.

The data deduplication system 105 further comprises a data deduplication engine 112, clustering logic 114, and a catalog manager 116.

The data deduplication engine 112 generally deduplicates data generated by edge devices 130 in a collaborative manner with the extension engines 122. For example, the data deduplication engine 112 can execute in the cloud and can collaborate with the extension engines 122 operating on the edge nodes 102 to reduce the amount of data that is transferred to the cloud.

The clustering logic 114, in some embodiments, can partition the edge nodes 102 into disjoint clusters or groups in order to further improve the collaborative deduplication. For example, the clustering logic 114 can assign two or more of the edge nodes 102 to a same cluster based on one or more similarity criteria. The catalog manager 116, in some embodiments, can generate and update a global catalog that identifies data (e.g., device data 107) that is stored in the cloud. The catalog manager 116 may also include functionality for sending and updating one or more local catalogs for a given one of the edge nodes 102 and/or one or more distributed catalogs corresponding to a cluster of the edge nodes 102. The one or more local catalogs can include information identifying the data that has been transferred from the given edge node 102 to the cloud, and the one or more distributed catalogs can include information identifying data that has been transferred from the cluster of edge nodes 102 to the cloud.

The FIG. 1 example shows the data deduplication system 105 separately from the edge nodes 102; however, this is not intended to be limiting and in other embodiments at least a portion of the data deduplication system 105 can be implemented on at least one of the edge nodes 102, or vice versa, for example.

It is to be appreciated that this particular arrangement of elements 112, 114 and 116 illustrated in the data deduplication system 105 and elements 120 and 122 illustrated in the edge nodes 102 of the FIG. 1 embodiment are presented by way of example only, and alternative arrangements can be used in other embodiments. For example, the functionalities associated with the elements 112, 114, and 116 and/or the functionalities associated with elements 120 and 122 in other embodiments can be combined into a single module or separated across a larger number of modules. As another example, multiple distinct processors can be used to implement different ones of the elements 112, 114, and 116 and/or different ones of the elements 120 and 122, or portions thereof.

At least portions of elements 112, 114 and 116 and/or at least portions of elements 120 and 122 may be implemented at least in part in the form of software that is stored in memory and executed by a processor.

It is to be understood that the particular set of elements shown in FIG. 1 for data deduplication system 105 involving edge nodes 102 of computer network 100 is presented by way of illustrative example only, and in other embodiments additional or alternative elements may be used. Thus, another embodiment includes additional or alternative systems, devices, and other network entities, as well as different arrangements of modules and other components. For example, in at least one embodiment, one or more of the data deduplication system 105 and at least one database 106 can be on and/or part of the same processing platform.

An exemplary process utilizing elements 112, 114, and 116 of an example data deduplication system 105 in computer network 100 will be described in more detail with reference to, for example, the flow diagram of FIG. 3.

An exemplary process utilizing elements 120-1 and 122-1 of an example edge node 102-1 in computer network 100 will be described in more detail with reference to, for example, the flow diagrams of FIGS. 4 and 5.

Figure 2A:
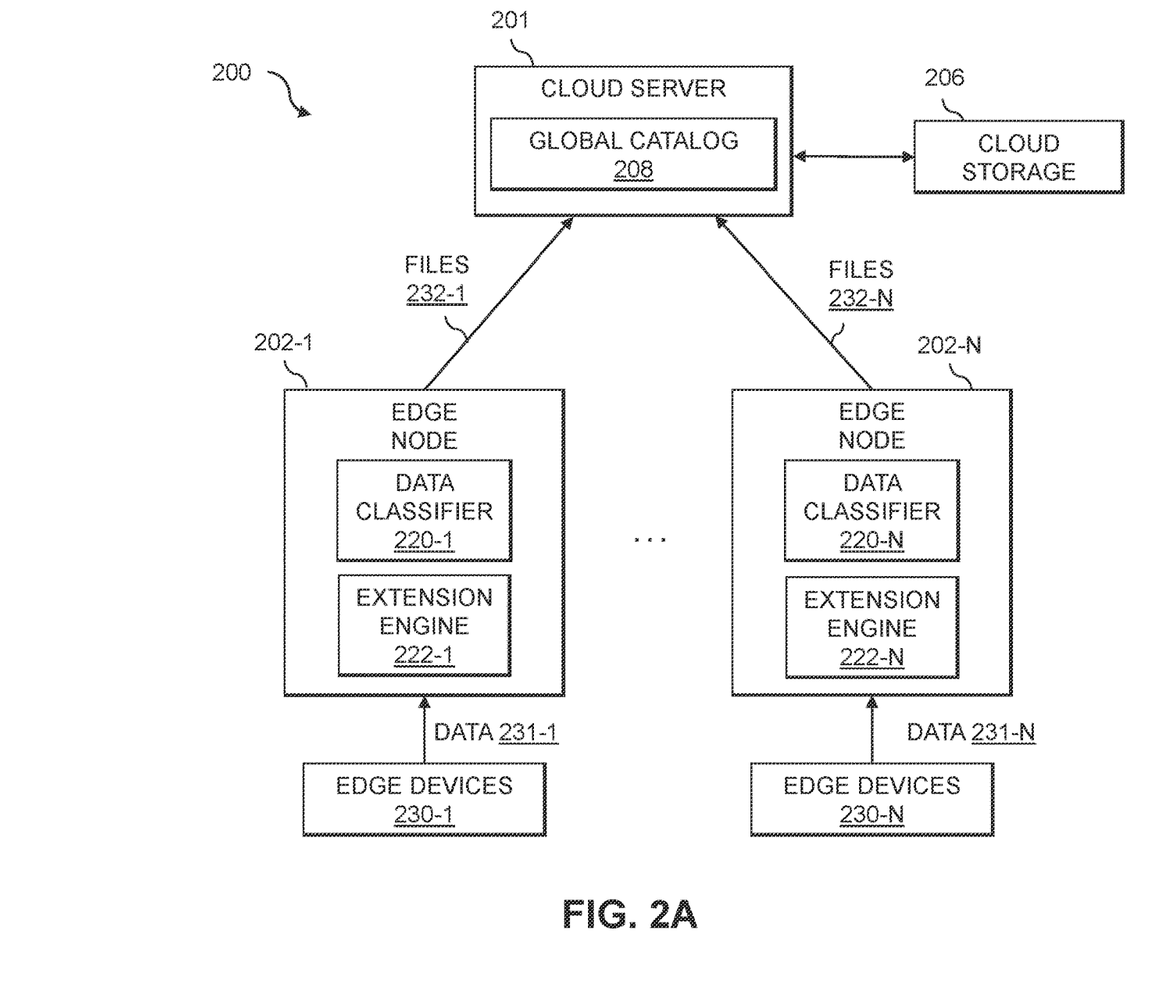
FIGS. 2A and 2B show examples of a distributed computing environment in illustrative embodiments.
Figure 2B:
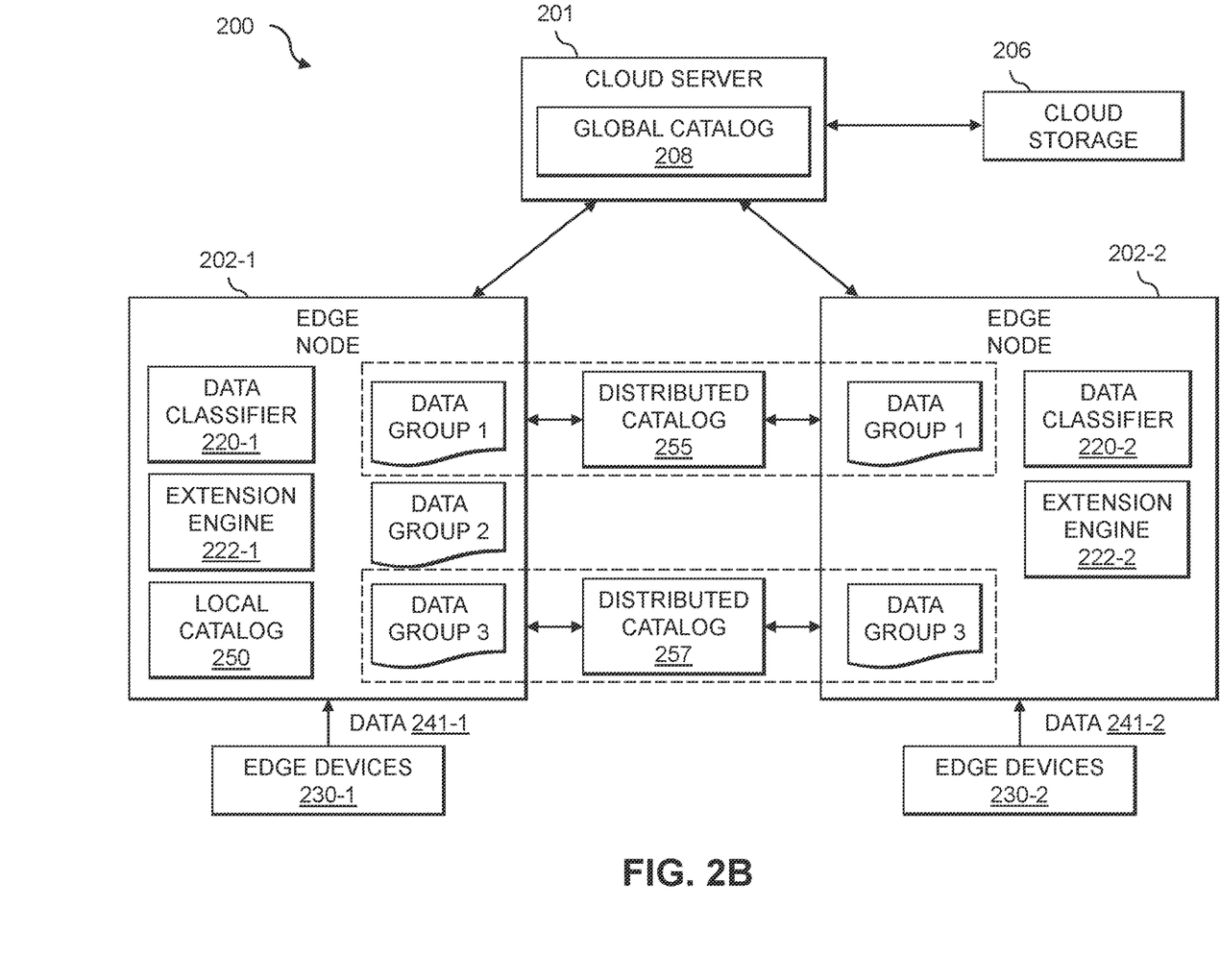

FIGS. 2A and 2B show examples of an edge computing environment 200 in illustrative embodiments. The edge computing environment 200 shown in FIG. 2A includes a plurality of edge nodes 202-1, . . . 202-N, collectively referred to herein as edge nodes 202, that are connected to a cloud server 201, and cloud storage 206. For example, the edge nodes 202 can correspond to edge nodes 102, and thus can include respective data classifiers 220-1, . . . 220-N (collectively, data classifiers 220) and respective extension engines 222-1, . . . 222-N (collectively, extension engines 222). Additionally, the cloud server 201 can correspond to the data deduplication system 105, and the cloud storage 206 can correspond to at least a portion of the one or more databases 106.

It is assumed that each of the edge nodes 202 obtains data from a respective set of one or more edge devices 230-1, . . . 230-N (collectively, edge devices 230). The edge nodes 202 can be configured to transfer (e.g., send and/or receive) data to one or more other edge nodes 202 and/or to the cloud server 201 using bandwidth allocated for edge computing environment 200.

In the example shown in FIG. 2A, the edge nodes 202 obtain respective sets of data 231-1, . . . 231-N (collectively referred to herein as data 231) from the edge devices 230. The data 231, in some embodiments, can include multiple types of data, such as unstructured data, structured data, and/or semi-structured data. In such embodiments, the data 231 can be preprocessed at the respective edge nodes 202 using the data classifiers 220, for example. The preprocessing can include dividing the data 231 based on the respective data types and determining a storage type to be used to store the data 231 based on the types of data. As a non-limiting example, structured data can be stored in one or more databases, unstructured data can be stored in a file repository, and semi-structured data can be added to a document database (e.g., a MongoDB). Additionally, in some embodiments, structured data can be stored in different databases based on available metadata. Using different storage types can improve the performance of storing and accessing the data 231 from cloud storage 206, for example.

In at least some embodiments, each of the edge nodes 202 can transform its corresponding data 231 into respective files 232-1, . . . 232-N. It is to be appreciated that the term "file" in this context and elsewhere herein is intended to be broadly construed so as to encompass, for example, an object used for organizing data and/or information related to such data (e.g., metadata). As non-limiting examples, a given file can be implemented as, or comprise, a dataset, a digital package, a container, a collection, and/or any other type of digital resource used to identify and/or store related data. In some embodiments, the files 232 can comprise different formats (e.g., one or more text file formats, one or more image file formats, etc.) and/or structures.

The edge nodes 202 can send the cloud server 201 the files 232 during a first (or initial) transfer window to be stored in cloud storage 206. In some embodiments, it is assumed that the edge nodes 202 have not previously sent the files 232 to the cloud server 201. Accordingly, the files 232 sent by the edge nodes 202 in the initial transfer window can include all of the data 231 and metadata related to the data 231. As non-limiting examples, the metadata for a given one of the files 232 can include information related to at least one of one or more types of the data in the file, one or more sources of the data (e.g., one or more of the edge devices 230), the edge node 202 that sent the file, one or more clusters or groups that the edge node 202 is assigned to, and/or applications or services that use the data in the file.

The cloud server 201 stores the files 232 in cloud storage 206 and creates a global catalog 208. An example of a process for storing the files 232 and creating the global catalog 208 is now described in conjunction with FIG. 3.

Figure 3:
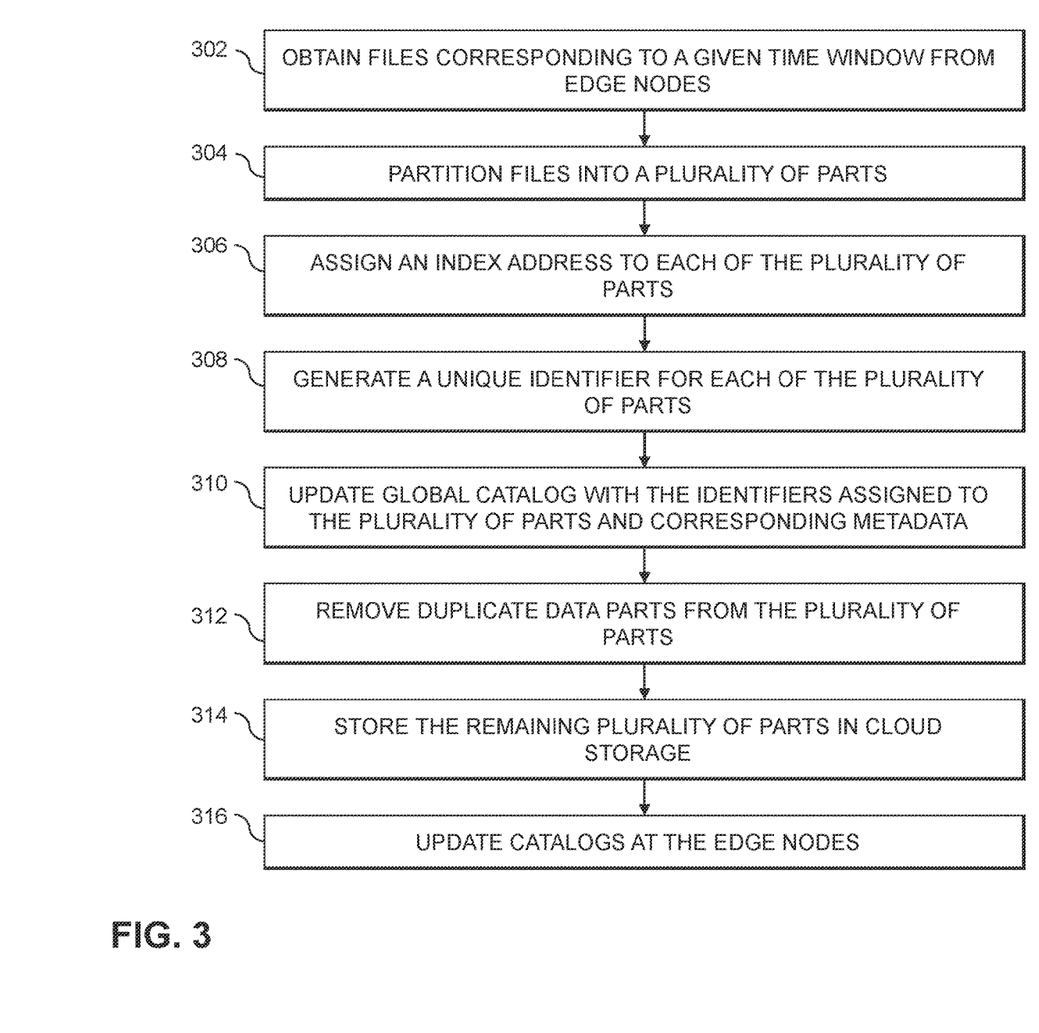
FIGS. 3 and 4 show examples of processes for deduplicating data in illustrative embodiments.

FIG. 3 is a flow diagram of a process for deduplicating data in an illustrative embodiment. It is to be understood that this particular process is only an example, and additional or alternative processes can be carried out in other embodiments.

In this embodiment, the process includes steps 302 through 316. These steps are assumed to be performed by the cloud server 201 and/or the data deduplication system 105 utilizing one or more of its elements 112, 114, and 116.

Step 302 includes obtaining files (e.g., files 232) corresponding to a given time window from a plurality of edge nodes (e.g., edge nodes 202).

Step 304 includes partitioning the files into a plurality of parts (also referred to as data chunks). For example, step 304 can partition the files so that the resulting parts have a consistent size, which can help improve the performance of finding duplicate parts, for example.

Step 306 includes assigning an index address to each of the plurality of parts.

Step 308 includes generating a unique identifier for each of the plurality of parts. For example, the parts can be hashed to obtain a hash for each part. In such an example, a given hash can act as a fingerprint that uniquely identifies the corresponding part.

Step 310 includes updating a global catalog (e.g., global catalog 208) with the identifiers assigned to the plurality of parts. It is noted that during the first (or initial) transfer window, the global catalog can be generated such that it includes the identifiers for all of the parts. Step 310 can also include adding metadata related to the parts, which can include, for example, one of a plurality of data groups assigned to the part. The data group for a given part, in some embodiments, can be based at least in part on the type of data corresponding to the given part. The metadata in the global catalog can also include other information related to the location (e.g., a location in storage) of the part, the node that supplied the part to the deduplication engine, and/or relationships between the hashes and the files. The metadata can be used to update catalogs associated with the edge nodes with information for identifying the files that have previously been uploaded, as explained in more detail in conjunction with FIG. 4, for example.

Step 312 includes removing duplicate data parts from the plurality of parts. For example, assuming that the global catalog includes some index information (e.g., identifiers of parts and associated metadata), then the identifiers in the global catalog can be compared to the identifiers of the parts being processed in the current transfer window. If a match is found, then the part can be removed. Step 312 can be performed for all of the edge nodes that provided files to the deduplication engine, for example.

Step 314 includes storing the remaining plurality of parts in cloud storage (e.g., cloud storage 206).

Step 316 includes initiating an update to the catalogs at the edge nodes. For example, the catalogs can include local catalogs (corresponding to individual edge nodes). In some embodiments, at least some of the catalogs can be distributed catalogs corresponding to a group or cluster of edge nodes, as explained in more detail elsewhere herein. In some embodiments, at least a portion of the local catalogs and/or the distributed catalogs can be defined for particular data groups. For example, updating the catalogs may include sending the relevant portions of the global catalog to the local catalogs of the edge nodes. Accordingly, the local catalog of each edge node can include the identifiers and other metadata of the data parts that have been checked by the deduplication process and stored in the cloud storage. In some embodiments, the local catalog of a particular node is updated with respect to the data sent by that node. The local catalog of the particular edge node does not receive catalog information for files or data ingested by another node in some examples. This allows the extension engine to identify subsequent data as duplicate data. It is noted that the catalogs can also include the hashing functions of each data part for the node or cluster of nodes as well as information related to the type of data associated with the respective catalog so that the edge nodes can identify which files need to be sent to the cloud server, for example.

As noted above, in some embodiments, clusters of edge nodes can be formed to further improve the performance of the deduplication process. Referring again to FIG. 2A, for example, the cloud server 201 can perform a clustering process (e.g., using clustering logic 114) to cluster the edge nodes 202 based at least in part on a set of features. For example, the edge nodes 202 can be configured with respective hardware and/or software configurations, and thus some of the edge nodes 202 may be able to process some types of data more efficiently than other ones of the edge nodes 202. The clustering process can leverage the features corresponding to the hardware and/or software configurations and similarities between different types of data to create clusters that can efficiently process the data.

In some examples, the clustering process can be based on a similarity coefficient (e.g., a Jaccard similarity coefficient). Generally, the Jaccard similarity coefficient (also referred to as the Jaccard index) is a statistical measure that can be used to determine a similarity of two sets of items and is defined as the proportion of elements that are shared by both sets relative to the total number of elements in either set. The mathematical representation of the Jaccard index may be expressed as follows:

$$J(A, B) = \frac{|A \cap B|}{|A \cup B|} = \frac{|A \cap B|}{|A| + |B| - |A \cap B|}.$$

In some embodiments, the similarities across the edge nodes 202 can be calculated as follows. Let T(a) be defined as the set of neighbor edge nodes of edge node a, T(b) be defined as the set of neighbor edge nodes of edge node b, k(a) as the number of neighbor nodes of node a, and k(b) as the number of neighbor nodes of node b. The clustering process can then be based on the following features: the number of neighbor nodes (i.e., k(a) and k(b)); the sum between the number of neighbor nodes (i.e., k(a)+k(b)) and the difference between the number of neighbor nodes (i.e., k(a)−k(b)); the number of common neighbor nodes (denoted as S(CN)=|T(a) ∩ T(b)|); and the Jaccard index:

$$J_{ab}^{Jaccard} = \frac{|T(a) \cap T(b)|}{|T(a) \cup T(b)|}.$$

The cloud server 201 can store the files 232 in the cloud storage based on the determined clusters and the types of data in each of the files 232. In the example of FIG. 2B, it is assumed that edge node 202-1 and edge node 202-2 have been assigned to the same cluster following the clustering process of the cloud server 201. Although not explicitly shown in FIG. 2B, it is to be appreciated that the edge computing environment 200 may include additional edge nodes 202 and/or clusters of edge nodes 202. More generally, the plurality of edge nodes 202 can be divided into disjoint clusters. Assuming that there are multiple edge nodes assigned to a given cluster, then the edge nodes can share one or more distributed catalogs, each of which can correspond to a type of data. As a non-limiting example, a distributed catalog for a given cluster can be implemented in a fault tolerant distributed key-value store, which can also be stored in a ledger, for example. In at least one example, the distributed catalog can be distributed across all of the nodes in the cluster.

In the FIG. 2B example, it is assumed that each of edge nodes 202-1 and 202-2 have obtained catalog data from the cloud server 201 for different data groups (data groups 1-3), as discussed above in conjunction with FIG. 3. Specifically, edge node 202-1 comprises a local catalog 250 corresponding to data group 2. In addition, edge nodes 202-1 and 202-2 are associated with distributed catalogs 255 and 257 corresponding to data groups 1 and 3, respectively, as indicated by the dashed boxes. Edge node 202-2 does not have a local catalog in the example of FIG. 2B. More generally, each of the edge nodes 202 can be associated with one or more local catalogs and/or one or more distributed catalogs.

In this example, edge node 202-1 obtains data 241-1 from one or more edge devices 230-1 and uses its data classifier 220-1 and extension engine 222-1 to perform a deduplication process based on catalogs 250, 255, and 257. Accordingly, data that has already been sent to the cloud server 201 and stored in the cloud storage 206 can be removed before it is uploaded. An example of such a deduplication process is now described in conjunction with FIG. 4.

Figure 4:
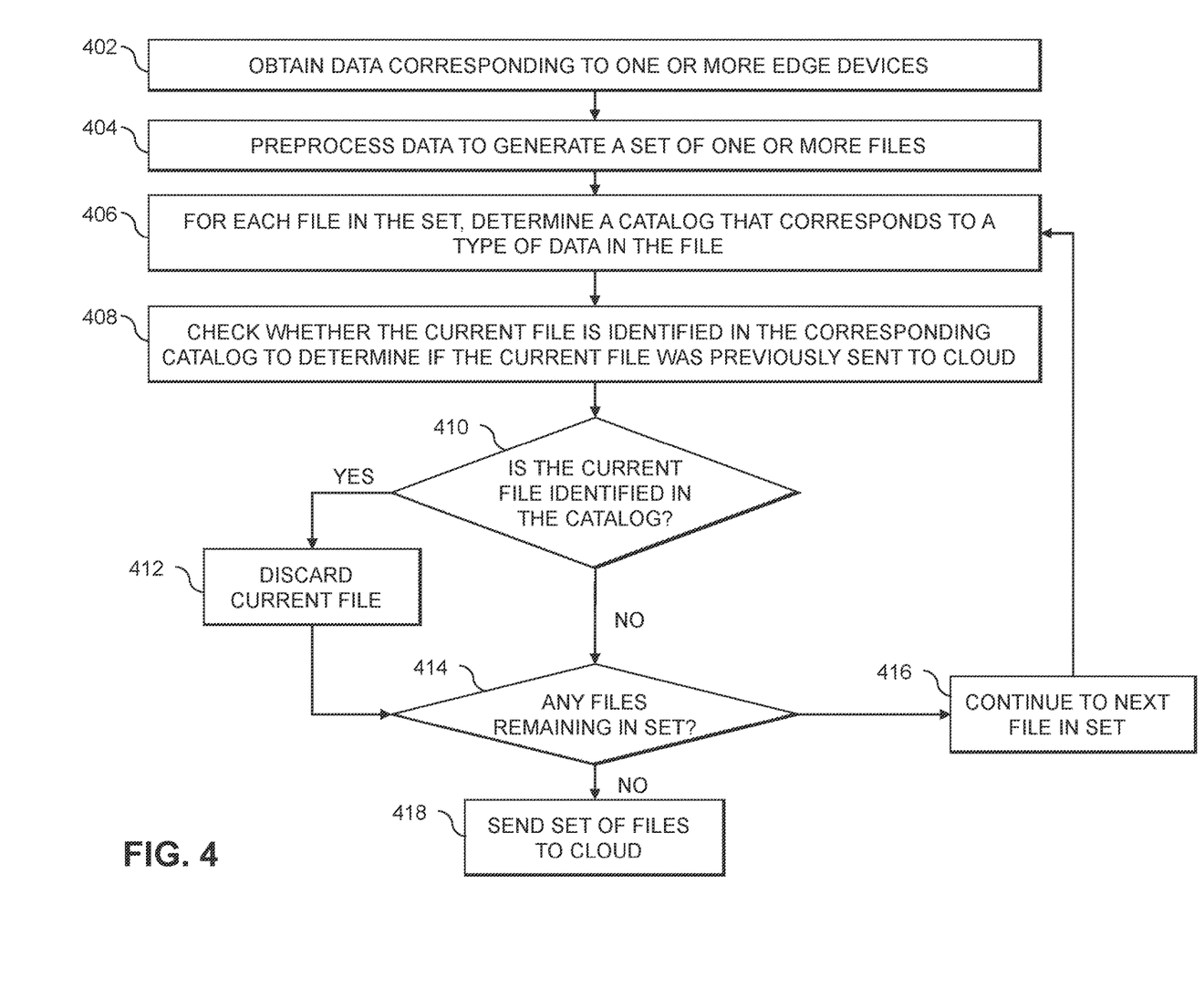

FIG. 4 is a flow diagram of a process for deduplicating data at an edge node in an illustrative embodiment. It is to be understood that this particular process is only an example, and additional or alternative processes can be carried out in other embodiments.

In this embodiment, the process includes steps 402 through 418. These steps are assumed to be performed by an edge node 102-1 (or edge node 202-1) utilizing one or more of its elements 120-1 and 122-1.

Step 402 includes obtaining data corresponding to one or more edge devices (e.g., edge devices 230-1).

Step 404 includes preprocessing the obtained data to generate a set of one or more files.

Step 406 includes, for each file in the set, determining a catalog that corresponds to a type of data in the file.

Step 408 includes checking whether the current file is identified in the corresponding catalog to determine if the current file was previously sent to the cloud.

Step 410 includes a test to determine whether the current file is identified in the corresponding catalog. If the result of step 410 is yes, then step 412 includes discarding the current file (e.g., removing the file from the set). Optionally, the file can be replaced with a reference (e.g., a pointer) to a location of the file in cloud storage, for example.

If the result of step 410 is no, then the process continues to step 414, which includes a test to check whether there are any files remaining in the set. If the result of step 414 is yes, then step 416 includes continuing to the next file in the set. Steps 406 through 414 are then performed for the next file. If the result of step 414 is no, then the process continues to step 418, which includes sending the set of files to the cloud (e.g., to cloud server 201). It is noted that the set of files sent at step 418 has been checked for duplicate data prior to the set of files being sent, and thus includes files that have not been previously sent and stored to the cloud.

In some embodiments, a given cluster of nodes can maintain multiple copies of each edge node's catalog entries, depending on the replication factor of the distributed catalogs. It is to be appreciated that the deduplication process in FIG. 4 can be performed for all nodes in the cluster rather than for a single node. For example, the data 241-1 corresponding to data group 1 can be checked against files corresponding to data group 1 that were previously received from the edge devices 230-2 by edge node 202-2. Accordingly, at least some of the files in the set sent to the cloud at step 418 can be based on more than one node, which can reduce the amount of data that needs to be uploaded to the deduplication engine.

Additionally, in at least some embodiments, the cloud server 201 can aggregate data from multiple different clusters and can deduplicate the corresponding data across the multiple clusters. After deduplication, which is performed as previously described at the cloud level, the distributed catalog(s) of each cluster can be updated.

Figure 5:
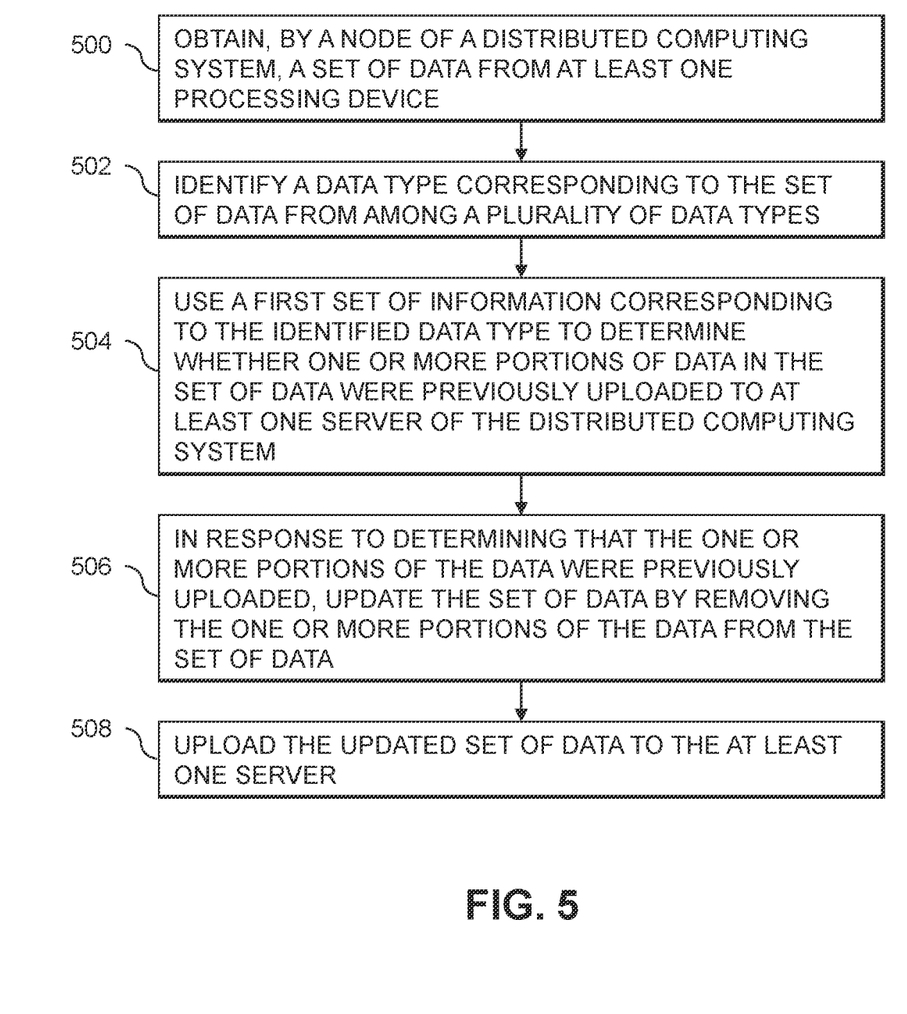
FIG. 5 shows a flow diagram of a process for deduplicating data in a distributed computing environment in an illustrative embodiment.

FIG. 5 is a flow diagram of a process for deduplicating data in distributed computing environments in an illustrative embodiment. It is to be understood that this particular process is only an example, and additional or alternative processes can be carried out in other embodiments.

In this embodiment, the process includes steps 500 through 508. These steps are assumed to be performed by a node of the distributed computing environment (e.g., the edge node 102-1 utilizing its elements 120 and 122).

Step 500 includes obtaining, by a node of a distributed computing system, a set of data from at least one processing device.

Step 502 includes identifying a data type corresponding to the set of data from among a plurality of data types.

Step 504 includes using a first set of information corresponding to the identified data type to determine whether one or more portions of data in the set of data were previously uploaded to at least one server (e.g., at least one cloud server) of the distributed computing system.

Step 506 includes, in response to determining that the one or more portions of the data were previously uploaded, updating the set of data by removing the one or more portions of the data from the set of data.

Step 508 includes uploading the updated set of data to the at least one server.

The plurality of data types may include two or more of at least one unstructured data type, at least one structured data type, and at least one semi-structured data type. As non-limiting examples, structured data can include data corresponding to a particular format (e.g., a tabular format), and unstructured data can correspond to data that does not follow a specific format (such as, image data, audio data, video data, etc.). Semi-structured data can include data that does not follow a specific format, but includes some organization properties (e.g., tags or markers).

The node comprises at least one second set of information corresponding to a different one of the plurality of data types. The process may include a step of using the at least one second set of information to determine whether portions of at least one additional set of data were previously uploaded to the at least one server of the distributed computing system. The portions of the set of data that were previously uploaded may be stored by the at least one server using a first storage technology associated with the identified data type, and the portions of the at least one additional set of data that were previously uploaded may be stored by the at least one server using a different, second storage technology associated with the data type corresponding to the at least one additional set of data. The storage technologies may, for example, correspond to one or more databases, one or more file repositories, and/or one or more document databases.

The process may further include a step of obtaining information for updating the first set of information from the at least one server in response to uploading the updated set of data.

The at least one server may maintain a global set of information for a plurality of nodes of the distributed computing system, where the global set of information comprises hash values that uniquely identify portions of data uploaded by one or more of the plurality of nodes and information indicating the data type of the portions of data uploaded by the one or more nodes. The first set of information may include hashing functions corresponding to the global set of information for portions of the set of data that were previously uploaded to the at least one server of the distributed computing system.

The node may be assigned to one of a plurality of clusters of nodes of the distributed computing system, where the plurality of clusters of nodes is determined based at least in part on a similarity coefficient. The first set of information may be distributed across the nodes in the cluster of nodes that the node is assigned to. The first set of information may be distributed across one of a plurality of clusters of nodes of the distributed computing system, where the plurality of clusters of nodes is determined based at least in part on a similarity coefficient, such as a Jaccard similarity coefficient. The distributed computing system may comprise, for example, an edge computing environment.

Accordingly, the particular processing operations and other functionality described in conjunction with the flow diagram of FIG. 5 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to significantly improve deduplication techniques in distributed computing environments. These and other embodiments can effectively overcome technical problems associated with existing techniques when deduplicating uncorrelated data (e.g., corresponding to different data types). For example, some embodiments are configured to perform a collaborative deduplication process that classifies and clusters data based on previously uploaded data. These and other embodiments can effectively reduce computing resources and improve performance of deduplicating data relative to conventional approaches.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 6 and 7. Although described in the context of system 100, these platforms may also be used to implement at least portions of other information processing systems in other embodiments.

Figure 6:
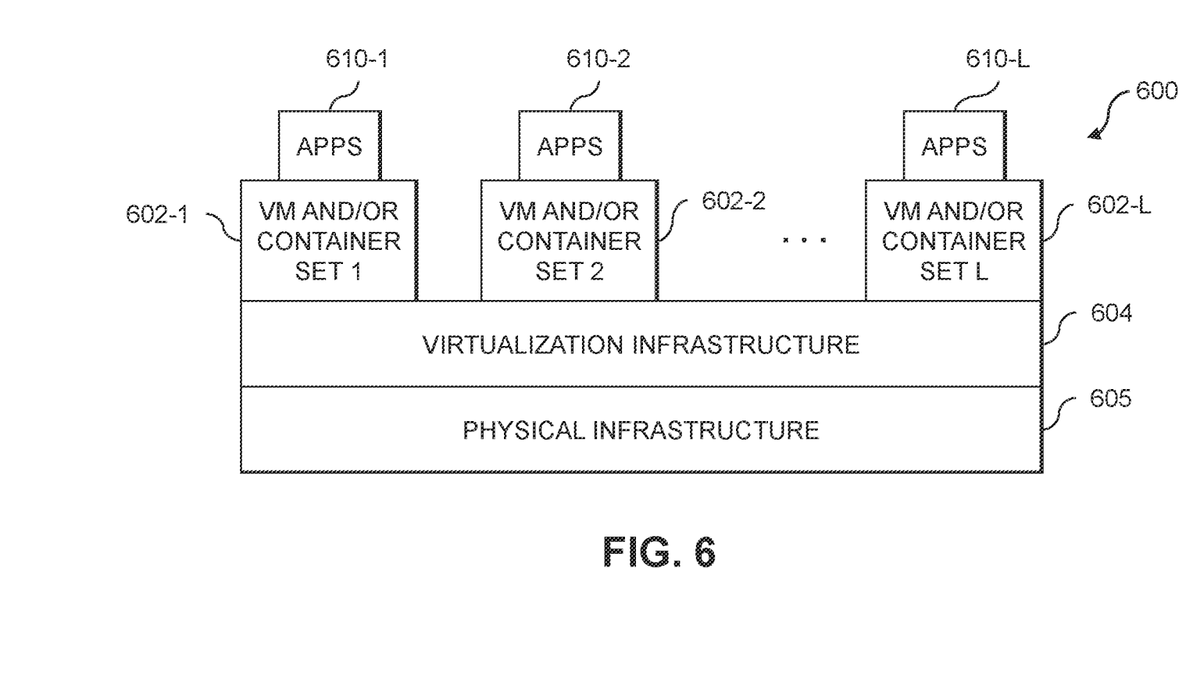
FIGS. 6 and 7 show examples of processing platforms that may be utilized to implement at least a portion of an information processing system in illustrative embodiments.
Figure 7:
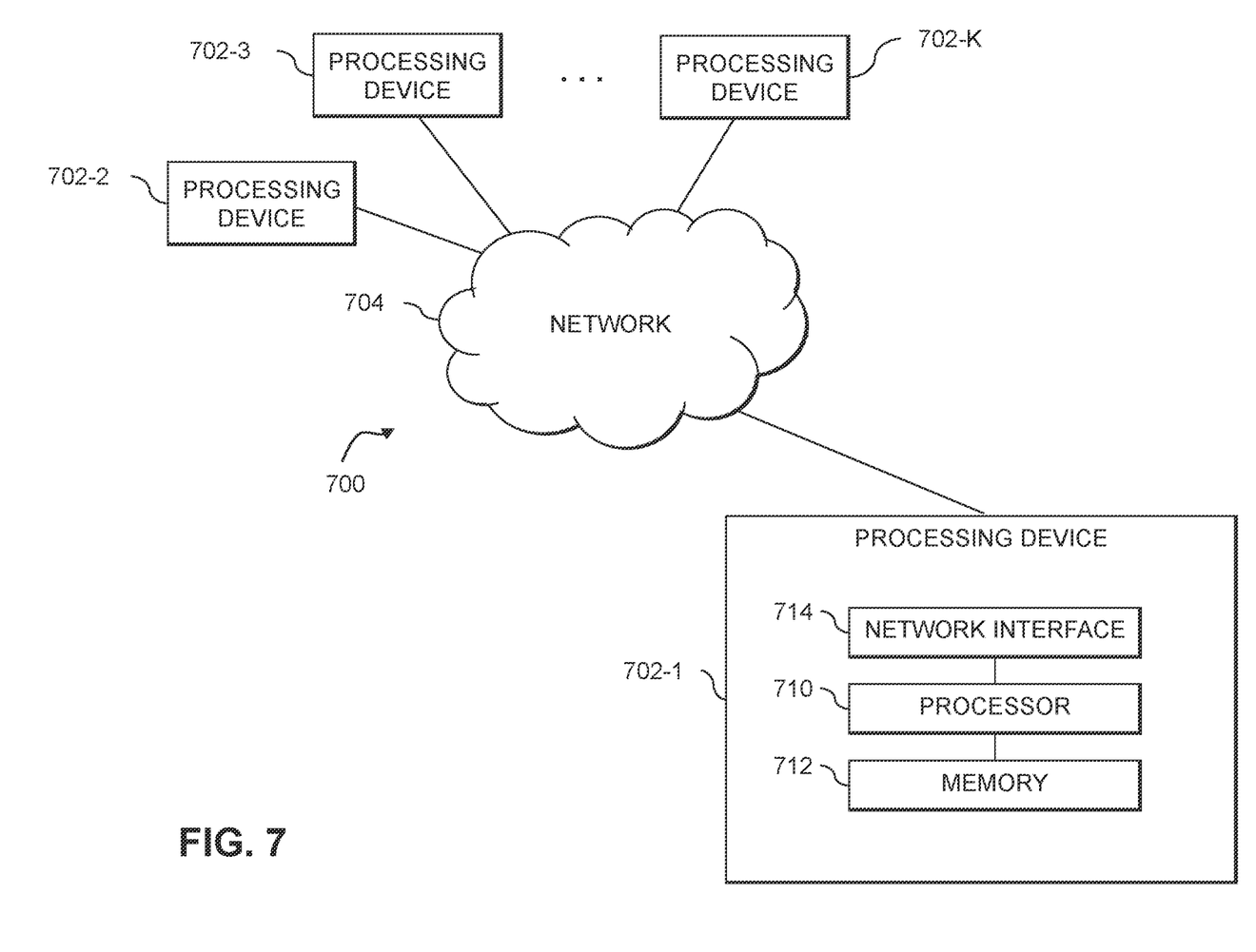

FIG. 6 shows an example processing platform comprising cloud infrastructure 600. The cloud infrastructure 600 comprises a combination of physical and virtual processing resources that are utilized to implement at least a portion of the information processing system 100. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 comprise respective VMs, respective sets of one or more containers, or respective sets of one or more containers running in VMs. In some implementations of the FIG. 6 embodiment, the VMs/container sets 602 comprise respective VMs implemented using virtualization infrastructure 604 that comprises at least one hypervisor.

A hypervisor platform may be used to implement a hypervisor within the virtualization infrastructure 604, wherein the hypervisor platform has an associated virtual infrastructure management system. The underlying physical machines comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 702-1 in the processing platform 700 comprises a processor 710 coupled to a memory 712.

The processor 710 comprises a microprocessor, a microcontroller, an ASIC, an FPGA, or other type of processing circuitry, as well as portions or combinations of such circuitry elements.

The memory 712 comprises RAM, ROM, or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk, or an integrated circuit containing RAM, ROM, or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
obtaining, by a node of a distributed computing system, a set of data from at least one processing device;
identifying a data type corresponding to the set of data from among a plurality of data types, wherein the plurality of data types comprises two or more of: at least one unstructured data type, at least one structured data type, and at least one semi-structured data type;
using a first set of information corresponding to the identified data type to determine whether one or more portions of data in the set of data were previously uploaded to at least one server of the distributed computing system;
in response to determining that the one or more portions of the data were previously uploaded, updating the set of data by removing the one or more portions of the data from the set of data; and
uploading the updated set of data to the at least one server;
wherein the method is performed by at least one processing device comprising a processor coupled to a memory.

2. The computer-implemented method of claim 1, wherein the node comprises at least one second set of information corresponding to a different one of the plurality of data types.

3. The computer-implemented method of claim 2, further comprising:
using the at least one second set of information to determine whether portions of at least one additional set of data were previously uploaded to the at least one server of the distributed computing system.

4. The computer-implemented method of claim 3, wherein:
the portions of the set of data that were previously uploaded are stored by the at least one server using a first storage technology associated with the identified data type; and
the portions of the at least one additional set of data that were previously uploaded are stored by the at least one server using a different, second storage technology associated with the data type corresponding to the at least one additional set of data.

5. The computer-implemented method of claim 1, further comprising:
obtaining information for updating the first set of information from the at least one server in response to uploading the updated set of data.

6. The computer-implemented method of claim 1, wherein:
the at least one server maintains a global set of information for a plurality of nodes of the distributed computing system, wherein the global set of information comprises hash values that uniquely identify portions of data uploaded by one or more of the plurality of nodes and information indicating the data type of the portions of data uploaded by the one or more nodes.

7. The computer-implemented method of claim 6, wherein:
the first set of information comprises hashing functions corresponding to the global set of information for portions of the set of data that were previously uploaded to the at least one server of the distributed computing system.

8. The computer-implemented method of claim 1, wherein:
the node is assigned to one of a plurality of clusters of nodes of the distributed computing system, wherein the plurality of clusters of nodes is determined based at least in part on a similarity coefficient.

9. The computer-implemented method of claim 8, wherein the first set of information is distributed across the nodes in the cluster of nodes that the node is assigned to.

10. The computer-implemented method of claim 1, wherein:
the first set of information is distributed across one of a plurality of clusters of nodes of the distributed computing system, wherein the plurality of clusters of nodes is determined based at least in part on a similarity coefficient.

11. A non-transitory processor-readable storage medium having stored therein program code of one or more software programs, wherein the program code when executed by at least one processing device causes the at least one processing device:
to obtain, by a node of a distributed computing system, a set of data from at least one processing device;
to identify a data type corresponding to the set of data from among a plurality of data types, wherein the plurality of data types comprises two or more of: at least one unstructured data type, at least one structured data type, and at least one semi-structured data type;
to use a first set of information corresponding to the identified data type to determine whether one or more portions of data in the set of data were previously uploaded to at least one server of the distributed computing system;
in response to determining that the one or more portions of the data were previously uploaded, to update the set of data by removing the one or more portions of the data from the set of data; and
to upload the updated set of data to the at least one server.

12. The non-transitory processor-readable storage medium of claim 11, wherein the node comprises at least one second set of information corresponding to a different one of the plurality of data types.

13. The non-transitory processor-readable storage medium of claim 12, wherein the program code when executed by the at least one processing device causes the at least one processing device:
to use the at least one second set of information to determine whether portions of at least one additional set of data were previously uploaded to the at least one server of the distributed computing system.

14. The non-transitory processor-readable storage medium of claim 13, wherein:
the portions of the set of data that were previously uploaded are stored by the at least one server using a first storage technology associated with the identified data type; and
the portions of the at least one additional set of data that were previously uploaded are stored by the at least one server using a different, second storage technology associated with the data type corresponding to the at least one additional set of data.

15. An apparatus comprising:
at least one processing device comprising a processor coupled to a memory;
the at least one processing device being configured:
to obtain, by a node of a distributed computing system, a set of data from at least one processing device;
to identify a data type corresponding to the set of data from among a plurality of data types, wherein the plurality of data types comprises two or more of: at least one unstructured data type, at least one structured data type, and at least one semi-structured data type;
to use a first set of information corresponding to the identified data type to determine whether one or more portions of data in the set of data were previously uploaded to at least one server of the distributed computing system;
in response to determining that the one or more portions of the data were previously uploaded, to update the set of data by removing the one or more portions of the data from the set of data; and
to upload the updated set of data to the at least one server.

16. The apparatus of claim 15, wherein the node comprises at least one second set of information corresponding to a different one of the plurality of data types.

17. The apparatus of claim 16, wherein the at least one processing device is further configured:
to use the at least one second set of information to determine whether portions of at least one additional set of data were previously uploaded to the at least one server of the distributed computing system.

18. The apparatus of claim 15, wherein the at least one processing device is further configured:
to obtain information for updating the first set of information from the at least one server in response to uploading the updated set of data.

19. The apparatus of claim 15, wherein:
the at least one server maintains a global set of information for a plurality of nodes of the distributed computing system, wherein the global set of information comprises hash values that uniquely identify portions of data uploaded by one or more of the plurality of nodes and information indicating the data type of the portions of data uploaded by the one or more nodes.

20. The apparatus of claim 15, wherein:
the node is assigned to one of a plurality of clusters of nodes of the distributed computing system, wherein the plurality of clusters of nodes is determined based at least in part on a similarity coefficient.

* * * * *